(12) United States Patent
Chen et al.

(10) Patent No.: US 10,936,527 B1
(45) Date of Patent: Mar. 2, 2021

(54) HOT-PLUGGABLE EXPANSION CARD SUPPORTING HIGH-DENSITY CONFIGURATIONS

(71) Applicant: Dell Products, L.P., Round Rock, TX (US)

(72) Inventors: Yuxin Chen, Shanghai (CN); Weidong Zuo, Shrewsbury, MA (US); Qingqiang Guo, Shanghai (CN); Gemma Chen, Shanghai (CN); Chen Zhao, Shanghai (CN); Haifang Zhai, Shanghai (CN)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 16/811,917

(22) Filed: Mar. 6, 2020

(51) Int. Cl.
*G06F 13/40* (2006.01)
*G06F 1/16* (2006.01)
*G06F 1/20* (2006.01)

(52) U.S. Cl.
CPC ........ *G06F 13/4081* (2013.01); *G06F 1/1679* (2013.01); *G06F 1/206* (2013.01); *G06F 13/4022* (2013.01)

(58) Field of Classification Search
CPC ..... G06F 13/4081; G06F 1/1679; G06F 1/206
See application file for complete search history.

(56) References Cited

U.S. PATENT DOCUMENTS

| | | | |
|---|---|---|---|
| 2007/0171966 A1* | 7/2007 | Light | H04L 5/14 375/232 |
| 2017/0322604 A1* | 11/2017 | Chen | G06F 1/181 |
| 2019/0278037 A1* | 9/2019 | Leigh | G02B 6/4268 |

* cited by examiner

*Primary Examiner* — Zachary K Huson
(74) *Attorney, Agent, or Firm* — Fogarty LLP

(57) ABSTRACT

Embodiments include expansion cards that provide a specialized capability, such as networking, when coupled to an Information Handling System (IHS). The expansion card embodiments include a printed circuit board (PCB) of a first width and a heat sink located on a top surface of the PCB. The expansion cards also include pins located on a distal end of the PCB, where the pins are received by a connector of the IHS. Embodiments include a button operable for ejecting a latch of the expansion card from a stored position in response to pressing the button. When ejected, the latch remains within the first width of the PCB, thus supporting high-density configurations of expansion cards. The ejected latch is further operable for an administrator to easily pull the expansion card from the IHS. Expansion card embodiments may also include vents that provide pathways for ventilating heated air away from the heat sink.

20 Claims, 11 Drawing Sheets

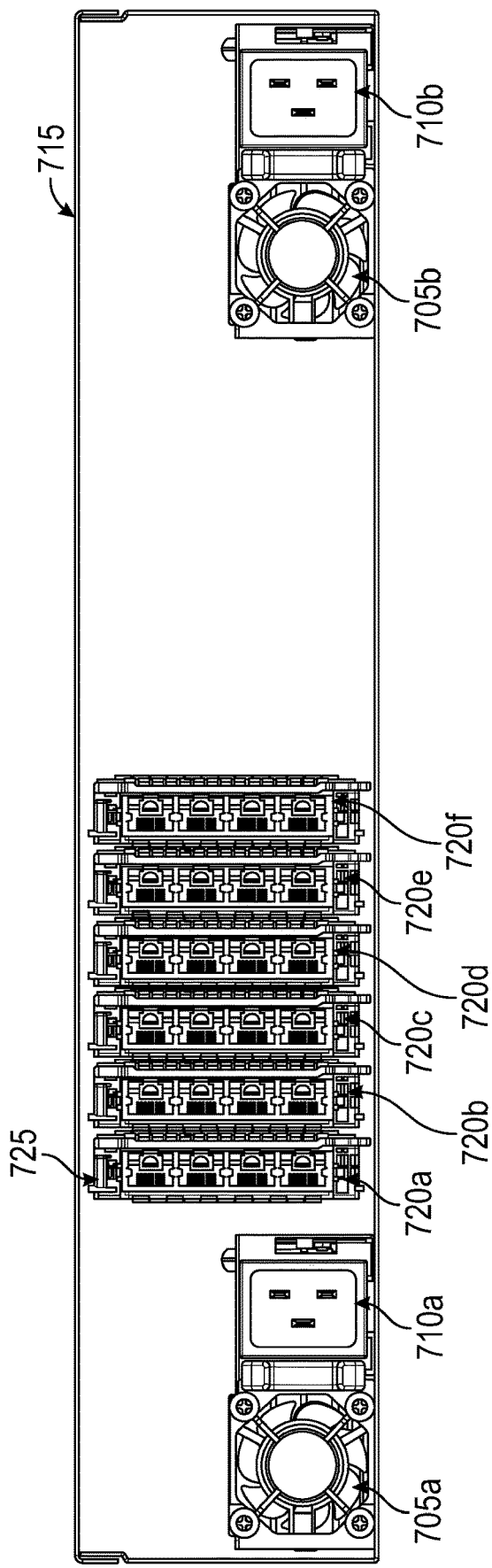
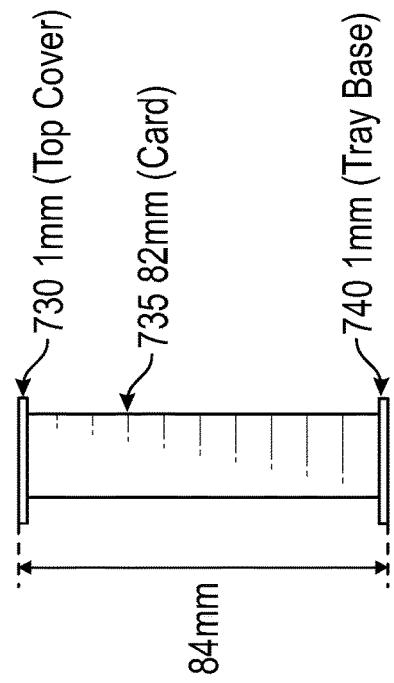
FIG. 7A
FIG. 7B

HOT-PLUGGABLE EXPANSION CARD SUPPORTING HIGH-DENSITY CONFIGURATIONS

FIELD

This disclosure relates generally to Information Handling Systems (IHSs), and more specifically, to hot-pluggable hardware components of IHSs.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

Groups of IHSs may be housed within data center environments. A data center may include a large number of IHSs, such as blade servers that are stacked and installed within racks. A data center may include large numbers of such racks that may be organized into rows in a manner that allows administrators to access IHSs via both the front and back while those IHSs remain installed and operational. In many instances, rack systems are constructed using standardized dimensions that define vertical and horizontal dimensions for components, such as blade server IHSs, that are installed within such racks. Standardized rack dimensions specify vertical units of space within a rack, where such units are commonly referred to as RUs (Rack Units). One RU typically corresponds to 44.45 millimeters of vertical space within a rack. Standard racks commonly accommodate 42 RUs of vertical space. The width for racks is similarly standardized, with racks commonly being 19 inches wide. IHSs, such as blade servers, that are constructed for rack-mounted installations may be designed to fit closely within these standardized rack dimensions in order to maximize use of the available space. Administrators may service replace components of certain rack-mounted IHSs while the an IHS remains operational and installed within the rack. Such components may be referred to as being hot-pluggable.

SUMMARY

Various embodiments provide expansion cards that provide a first capability upon being coupled to an Information Handling System (IHS). The expansion card embodiments may include: a printed circuit board of a first width; a plurality of pins located on a distal end of the printed circuit board and received by a connector of the IHS; a heat sink located on a top surface of the printed circuit board; and a button operable for ejecting a latch of the expansion card from a stored position when the button is depressed, wherein the ejected latch is operable for decoupling the expansion card from the IHS, and wherein the ejected latch remains within the first width of the printed circuit board.

In additional expansion card embodiments, the first capability comprises a networking capability and the expansion card further includes: a plurality of I/O ports located on a proximal end of the printed circuit board, wherein the plurality of I/O ports are comprised within a housing. In additional embodiments, expansion cards may also include a vent structure attached to a top surface of the housing, wherein the vent structure comprises pathways for the exhaust of heated air from within the IHS. In additional expansion card embodiments, the vent structure routes heated airflow past the latch in the stored position. In additional expansion card embodiments, the vent structure comprises two or more rows of vents oriented to route the heated airflow past the latch in the stored position. In additional expansion card embodiments, the first width is approximately 76 millimeters. In additional expansion card embodiments, the latch is recessed from a proximal face of the expansion card when the latch is in the stored position. In additional expansion card embodiments, a thickness of the expansion card is approximately 17.8 millimeters. In additional expansion card embodiments, the latch is fixed to a top surface of the housing in the stored position. In additional expansion card embodiments, the expansion card is installed vertically within a 2 RU (rack unit) chassis.

In various additional embodiments, Information Handling Systems may include: one or more processors and a memory device coupled to the one or more processors; a chassis; an expansion bay comprised within the chasses, the expansion bay supporting a coupling to an expansion card providing a first capability to the IHS; the expansion card comprising: a printed circuit board of a first width; a plurality of pins located on a distal end of the printed circuit board and received by the expansion bay coupling; a heat sink located on a top surface of the printed circuit board; and a button operable for ejecting a latch of the expansion card from a stored position when the button is depressed, wherein the ejected latch is operable for removing the expansion card from the expansion bay of the IHS, and wherein the ejected latch remains within the first width of the printed circuit board.

In additional IHS embodiments, the first capability comprises a networking capability and the expansion card further includes: a plurality of I/O ports located on a proximal end of the printed circuit board, wherein the plurality of I/O ports are comprised within a housing. In additional IHS embodiments, the expansion card further includes a vent structure attached to a top surface of the housing, wherein the vent structure comprises pathways for the exhaust of heated air from within the expansion bay. In additional IHS embodiments, the first width is approximately 76 millimeters. In additional IHS embodiments, a thickness of the expansion card is approximately 17.8 millimeters. In additional IHS embodiments, the latch is recessed from a proximal face of the expansion card when the latch is in the stored position.

In various additional embodiments, methods are provided for decoupling an expansion card from an Information Handling System (IHS), wherein the expansion card comprises a plurality of I/O ports, the method includes: depressing a button located on a proximal face of the expansion card, wherein depressing the button partially ejects a latch of the expansion card from a stored position above the I/O ports; rotating the partially ejected latch to a fully ejected position, wherein the fully ejected latch remains within a first width of the expansion card; and pulling on the fully ejected latch in order to remove the expansion card from an expansion slot of the IHS. In additional method embodiments, the latch is recessed from a proximal face of the expansion card when the latch is in the stored position. In additional method embodiments, the first width is approximately 76 millimeters. In additional method embodiments, a thickness of the expansion card is approximately 17.8 millimeters.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

FIG. 7A is an illustration of the rear of a 2 RU chassis configured with expansion cards according to various embodiments, where the expansion cards are oriented vertically within the IHS.

FIG. 7B is a diagram illustrating certain vertical dimensions of the chassis of FIG. 7A that is configured with vertically-oriented expansion cards according to various embodiments.

DETAILED DESCRIPTION

Figure 1:
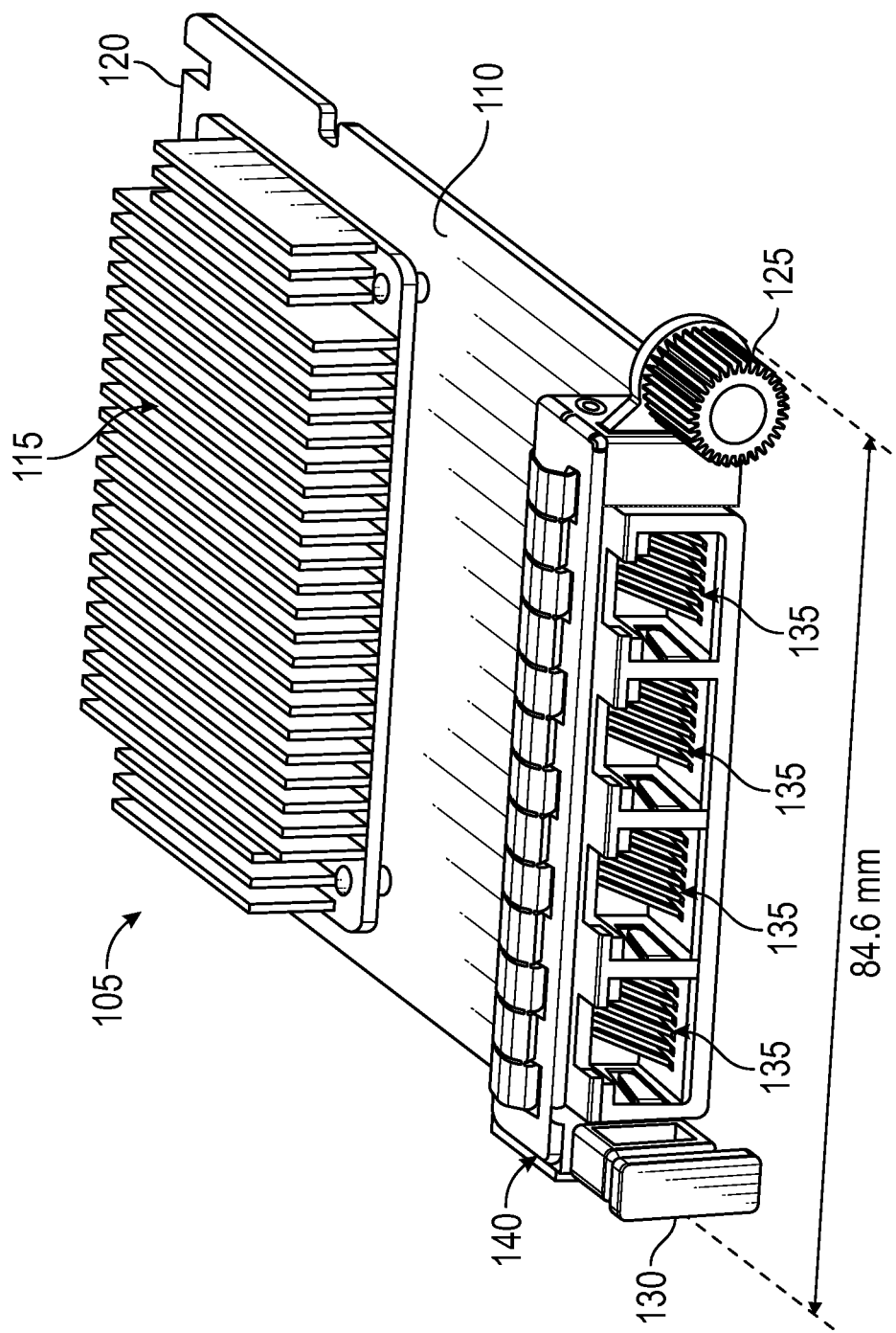
FIG. 1 is an illustration of an existing expansion card.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources, such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below. It should be appreciated that although certain IHSs described herein may be discussed in the context of an enterprise computing servers, other embodiments may be utilized.

As described, a rack may house multiple different chassis and a data center may house numerous racks. Each rack may host a large number of IHSs that are installed as components of chassis, where the chassis are stacked and installed within racks. In certain instances, the front-side of such rack-mounted chassis may include one or more bays that each receive an individual sled (that may be additionally or alternatively referred to as a tray, blade, and/or node), such as compute sleds and storage sleds. A chassis may support a variety of different numbers (e.g., 4, 8, 16, 32), sizes (e.g., single-width, double-width) and physical configurations of bays. Such sleds may be individually installed and removed from the chassis, thus allowing the computing and storage capabilities of a chassis to be reconfigured by swapping the sleds with different types of sleds.

By configuring a chassis with different sleds, the chassis may be adapted to support specific types of operations, thus providing a computing solution directed towards a specific type of computational task. For instance, a chassis that is configured to support artificial intelligence computing solutions may include compute sleds that include specialized artificial intelligence processors or other specialized artificial intelligence components, such as specialized FPGAs. In another example, a chassis may include compute sleds and storage sleds that support secure and isolated execution spaces for specific types of virtualized environments. A chassis may also be adapted for specific computing tasks through the use of different expansion cards that may be installed in expansion bays located on the back of an IHS such as a rack-mounted server. For instance, a chassis configured to support specific data mining operations may include network controller expansion cards that support high-speed couplings with other similarly configured chassis, thus supporting high-throughput, parallel-processing computing solutions.

In support of such adaptable capabilities of such rack-mounted IHSs, data center administrators may regularly hot swap components, such as hot swapping sleds installed in the front-facing bays of a blade server. Administrators may similarly hot-swap components from rear-facing bays, such as specific types of expansion cards that may provide an IHS with specialized capabilities. A network controller card is a common type of expansion card that is utilized by rack-mounted severs and installed via rear-facing expansion bays of the server. In a data center, hot swapping rear-facing components such as expansion cards requires an administrator to access the card, decouple it and remove it from the chassis all while the server remains operational and coupled to numerous cables. Adding to the difficulty, the sever is typically installed closely to other servers that are running and connected to various cables. In order for such tasks to be performed safely and reliably, administrators must be able to perform such tasks without significant physical effort. As described in additional detail below, existing expansion cards pose difficulties for administrators attempting to hot swap these existing expansion cards. Existing expansion cards also utilize available rack space inefficiently due to the mechanisms utilized for installing and replacing these existing expansion cards.

FIG. 1 is an illustration of an existing expansion card 105. The expansion card 105 provides networking capabilities to an IHS upon being coupled to a compatible expansion slot of the IHS, such as an expansion slot provided within a rear-facing expansion bay of an IHS. The expansion card 105 is formed from a printed circuit board (PCB) 110 that includes one or more sets of pins along the distal edge 120 of the PCB 110. The expansion card 105 is coupled to the IHS by inserting the pins along the distal edge 120 into an expansion slot of the IHS. In many instances, the expansion card 105 is coupled to an expansion slot of a midplane or backplane of a rack-mounted server, thus providing the server with networking capabilities. In providing networking capabilities, expansion card 105 may include processors and various other heat-generating components. Accordingly, expansion card 105 may include a heat sink 115 used to dissipate heat generated by such components of the expansion card.

As illustrated, the existing expansion card 105 includes a thumbscrew 125 installed on the proximal side of the expansion card. The thumbscrew 125 is received by the chassis of the IHS, or by a mounting bracket of the IHS. An administrator may install the expansion card 105 in an IHS by sliding the PCB 110 within rails provided by the chassis of the IHS until the pins on the distal edge 120 are mated with the expansion slot of the IHS. Once coupled, the thumbscrew 125 may be used to securely fasten the expansion card 105 in place. To remove the expansion card 105, the administrator loosens the thumbscrew 125 and uses a tab 130 protruding from the proximal side of expansion card to pull the expansion card from its coupled position and remove it from the IHS.

The expansion card 105 of FIG. 1 includes four RJ45 network ports 135 along the proximal side of the expansion card, where the network ports 135 are included within a housing 140 installed on the top-side of the PCB 110. When the expansion card 105 is coupled to a server, cables providing network connections may be coupled to each of the network ports 135. As illustrated in FIG. 1, the width of the existing expansion card 105 is 84.6 millimeters, including the width of network ports 135, removal tab 130 and the thumbscrew 125. As described in detail with regard to the below embodiments, the additional width of the existing expansion card 105 that results from the use of thumbscrew 125 precludes the arrangement of multiple such expansion cards in high-density configurations.

Figure 2A:
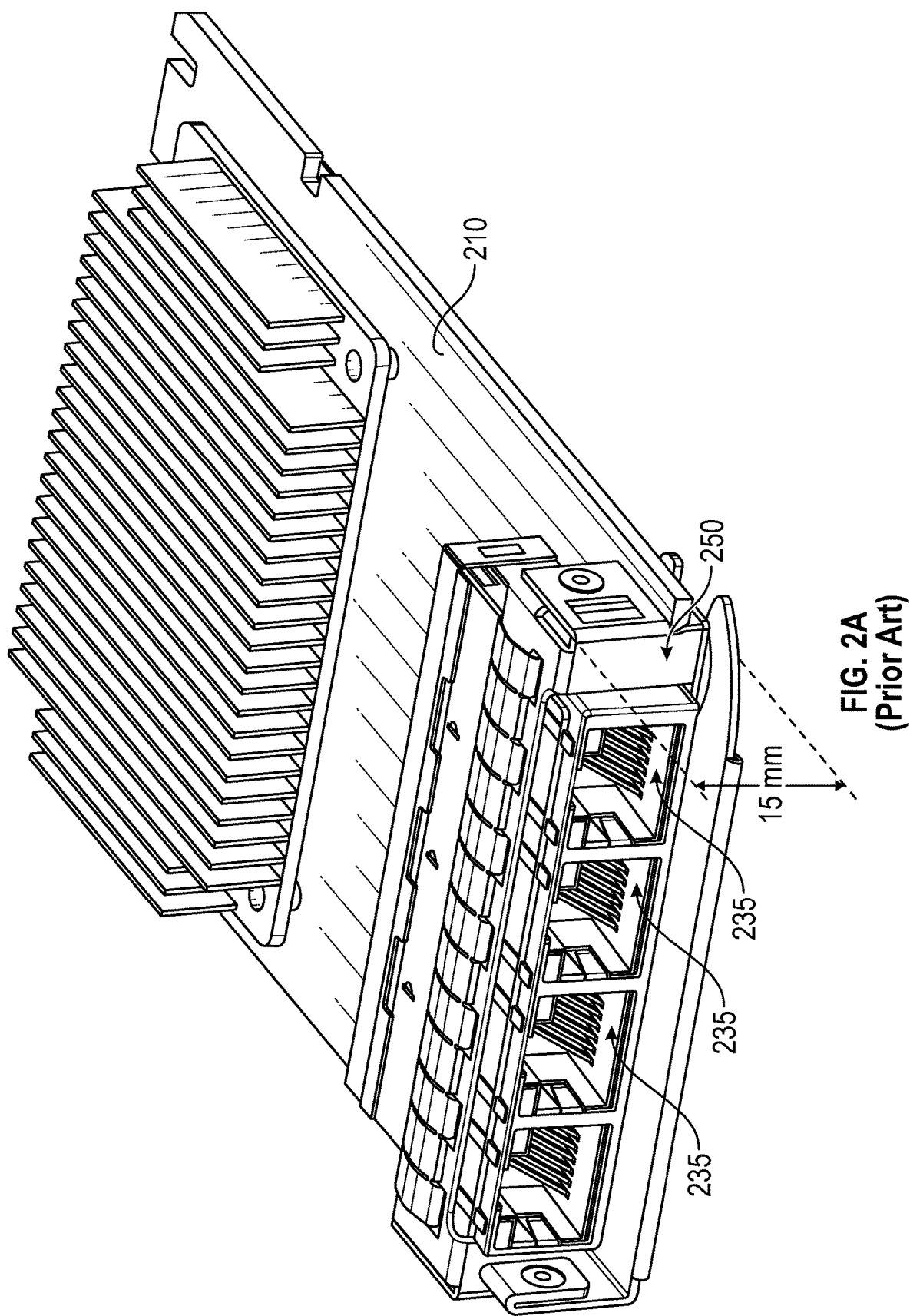
FIG. 2A is an illustration of an additional existing expansion card.

FIG. 2A is an illustration of an additional existing expansion card 205. As with the existing expansion card of FIG. 1, expansion card 205 is formed from a PCB 210 that includes pins along a distal edge 220 that are received by an expansion slot of an IHS. Also as with FIG. 1, expansion card 205 may include a processor and/or other heat generating components that are cooled at least in part through the heat dissipation of heat sink 215. Further like the expansion card of FIG. 1, expansion card 205 includes four RJ45 ports 235 within a housing 250, where these ports 235 may be used to couple network cables to the installed expansion card. Whereas the existing expansion card of FIG. 1 is attached to the chassis of an IHS through fastening of a thumbscrew, the existing expansion card 205 of FIG. 2A may be fastened to an IHS solely by the force required to mate the pins of distal edge 220 to the expansion slot of the IHS.

In order to support a reliable and lasting coupling to an IHS, the wipe length of the pins of the distal edge 220 must be long enough to support such a coupling. Accordingly, expansion card 205 may require a substantial wipe length that requires a significant amount of force to couple and decouple the expansion card from an expansion slot. In order to support removable of expansion card 205 from its coupled position, expansion card may include a handle 225 that may be used by an administrator to pull the expansion card from the expansion slot. As illustrated, the handle 225 is located on the proximal side of the expansion card 205 and sits below the RJ45 networking ports 235. In this position, handle 225 protrudes past the front-face of the networking ports 235, thus obscuring the ports 235 and any indicator lights that may be located on the front-face of the ports 235. Also as illustrated, the handle 225 includes a perpendicular tab 230 that protrudes to the left of the networking ports 235.

Figure 2B:
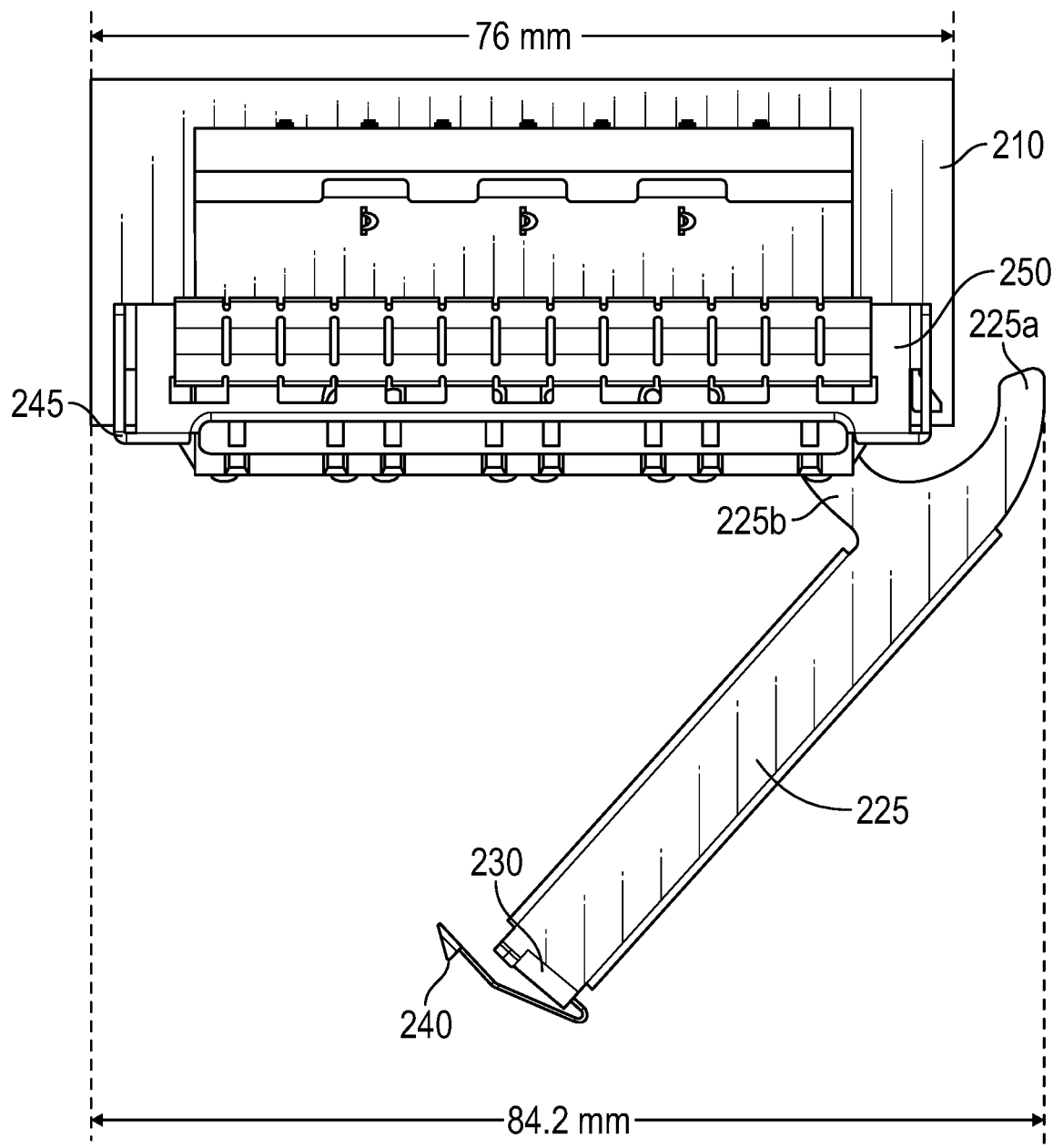
FIG. 2B is a top-view illustration of the operation of the existing expansion card of FIG. 2A.

FIG. 2B is a top-view illustration of the operation of the handle 225 of the existing expansion card 205 of FIG. 2A. As illustrated in FIG. 2B, the handle 225 may be released from its fixed position illustrated in FIG. 2A and rotated outward from the proximal side of the expansion card 205. In order to extend handle 225 in this manner, an administrator must pull the handle from its fixed position shown in FIG. 2A. As illustrated in FIG. 2B, the perpendicular tab 230 of handle 225 includes a clip 240. The clip 240 is received by a corresponding slot 245 provided by the housing 250 of the expansion card 205. In order to release the clip 240 from its secured position in slot 245, an administrator typically places a finger against the perpendicular tab 230 and uses a thumb to depress the clip 240 until it is released from slot 245. At this point, the administrator then uses the perpendicular tab 230 to rotate the handle 225 outwards as illustrated in FIG. 2B. With the handle 225 in this rotated position, the administrator may then pull the expansion card from its installed expansion bay.

The described manipulation of the clip 240 required to release the handle 225 from its fixed position may be difficult for some administrators. For instance, administrators with larger fingers or with weak fingers may experience difficulty in manipulating the clip 240. In some instances, expansion card 205 may be installed adjacent to other components that may limit the space available for the administrator's fingers to access clip 240. In other instances, expansion card 205 may be installed as the left-most component on the rear of a server. In such instances, the left side of expansion card 205 may abut with the enclosure of the server, thus limiting the space available for accessing clip 240. The difficulty of accessing clip 240 may be increased due to the protruding position of handle 225, especially if the administrator is accessing a server installed at a rack position that is above the administrator's eye level.

As illustrated in FIG. 2B, once handle 225 has been released from its secured position and rotated outwards, a portion of the handle 225 extends beyond the width of the existing expansion card 205. Even though the width of the existing expansion card 205 is 76 millimeters, the clearance required for rotation of handle 225 requires an effective width of 84.2 millimeters. As described in additional detail with regard to the below embodiments, this additional width required to support existing expansion card 205 precludes the arrangement of multiple such expansion cards in high-density arrangements. As described, existing expansion card 205 may be secured to a server through the mating of pins on the distal edge 220 with an expansion slot of the server. Supporting a reliable coupling in this manner may be accomplished through extending the wipe length of this coupling, thus increasing the force required to insert and remove the expansion card 205 from the expansion slot. When removing expansion card 205 from a server, the protruding arm 225a of handle 225 may be used by an administrator to apply a force against the chassis of the server and thus generate leverage by which the pivoting arm 225b of handle 225 pulls the expansion card 205 outward from it's coupled position. In order to support such operation of a handle 225, existing expansion card 205 must be installed such that no other components are installed immediately adjacent to the right edge of the existing expansion card 205, thus further limiting the density with which multiple expansion cards may be installed.

Figure 3A:
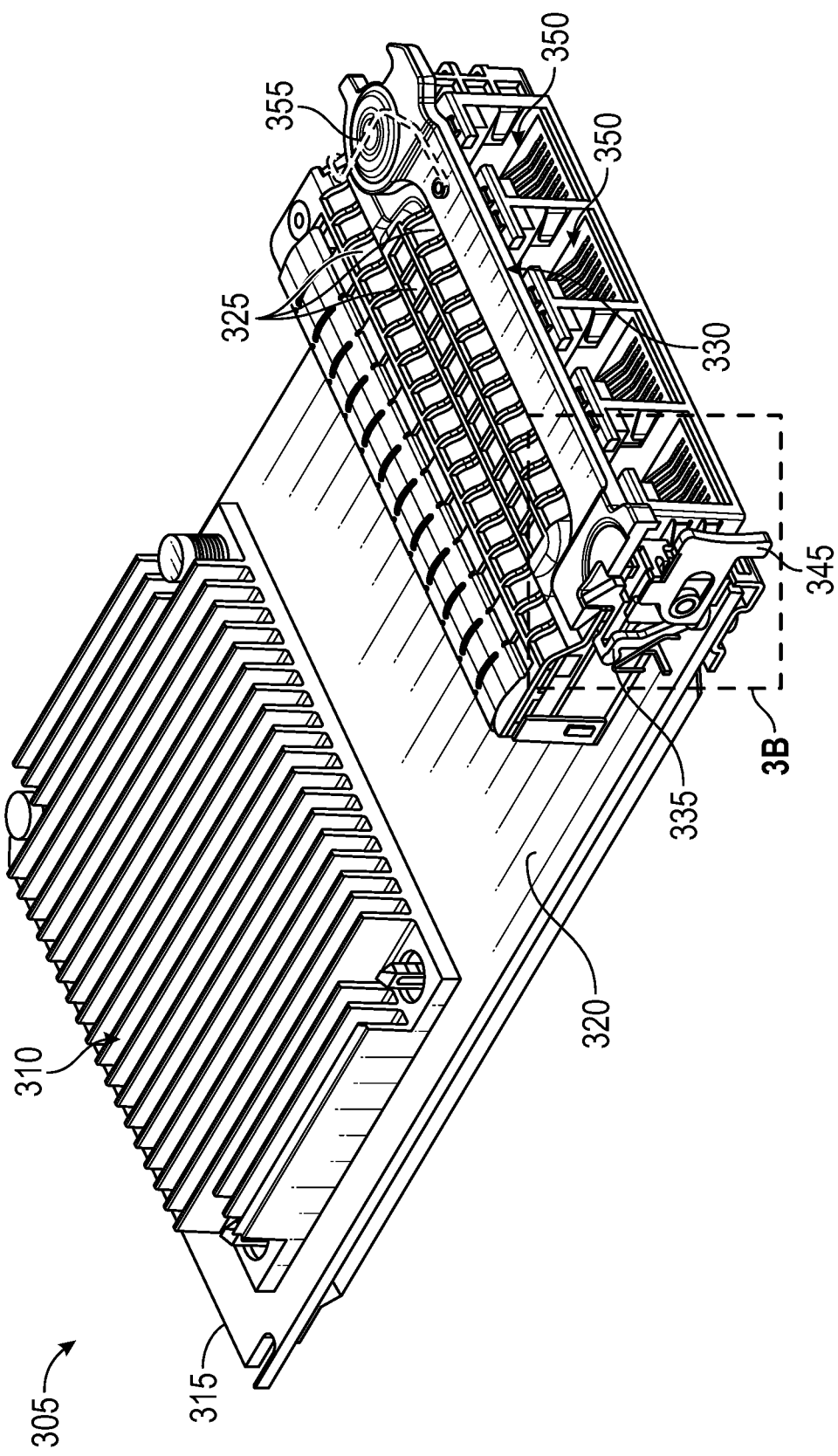
FIG. 3A is an illustration of an expansion card according to various embodiments.

FIG. 3A is an illustration of an expansion card 305 according to various embodiments. In the same manner as the expansion cards of FIGS. 1, 2A and 2B, expansion cards 305 according to embodiments are constructed from a PCB 320 that includes one or more sets of pins on a distal edge 315 of the PCB. The left and right edges of expansion card 305 may be received by rails of an IHS, such as a rack-mounted server, providing within an expansion bay of the IHS. The pins on the distal edge 315 of the PCB 320 are received by a compatible expansion slot of the IHS. In many instances, expansion card 305 may be installed within a rear-facing expansion bay of a rack-mounted server. In such instances, installation of expansion cards 305 may result in a coupling to a backplane or midplane of the server.

Once installed, the proximal side of the expansion card 305 remains exposed on the rear-face of the IHS. With the expansion card 305 installed in this manner, various types of cables may be physically coupled to one or more ports 350 located on the proximal side of the expansion card 305. In the illustrated embodiment, the ports 350 of expansion card 305 are four RJ45 networking ports that may each receive an ethernet cable providing a network connection to the expansion card 305. Various other expansion card embodiments may include different types and numbers of ports. For instance, some embodiments may instead include four SFP (small form-factor pluggable) ports arranged side-by-side in a similar manner to the RJ45 ports 350 of FIG. 3A. Other embodiments may instead include two larger QSFP (quad small form-factor pluggable) ports that are arranged side-by-side. Via such SFP and QSFP ports, fiber-optic cables may be coupled to the expansion card 305 in order to establish data and/or network connections to the expansion card 305. Other expansion card 305 embodiments may utilize various other types of ports that may provide data and/or network connections to an IHS.

In various embodiments, installed on PCB 320, expansion card 305 may include one or more processors, microprocessors, FPGAs or other logic units that consume power and generate heat during operation of the expansion card. In some embodiments, such logic units may be used to manage the network and/or data connections received via the ports 350 of the expansion card 305 and to route data between the coupled connections and the IHS to which the expansion card 305 has been installed. The PCB 320 of expansion card 305 may also include various capacitive and/or resistive components that also generate heat during the operation of expansion card. As illustrated, a heat sink 310 may be mounted on PCB 320 and used to dissipate heat generated by components of the expansion card 305. As described in additional detail below, embodiments may include rows of vents 325 installed on the top side of the housing 355 in which the network ports 350 are enclosed. Utilizing such rows of vents 325, embodiments provide improved ability to circulate heated air away from heat sink 310 and thus provide improved cooling of expansion card 305 while also supported high-density configurations of expansion card embodiments.

As described, an administrator may install the expansion card 305 within an expansion bay of an IHS by sliding the left and right edges of PCB 320 into rails provided by the chassis, or by a mounting bracket. The administrator completes the installation of expansion card 305 by pushing the card along these rails until the pins along the distal edge 315 of the PCB are mated with an expansion slot of the IHS. As a hot pluggable component, expansion card 305 may be installed in this manner while the IHS remains operational. Similarly, an administrator may remove expansion card 305 from its installed position while the IHS is operating.

In support of the ability for an administrator to easily unplug and remove the expansion card 305 from an IHS that is powered and operating, FIG. 3A illustrates a latch 330 that may be used to pull the expansion card 305 from its installed position and to remove the expansion card from the IHS. As illustrated, in its stored position, latch 330 may be recessed from the distal face of the expansion card 305 that is formed by the networking ports 350. In this stored position, latch 330 thus remains unobtrusive to administrators plugging and unplugging cables within these networking ports 350. Additionally, the recessed position of the stored latch 330 also results in the latch remaining unobtrusive to the various types of indicator lights that may be utilized on the front-face of the network ports 350. This unobtrusive position of the stored latch 300 improves the ability for administrators to access and view ports 350 regardless of where an IHS installed within a rack.

Figure 3B:
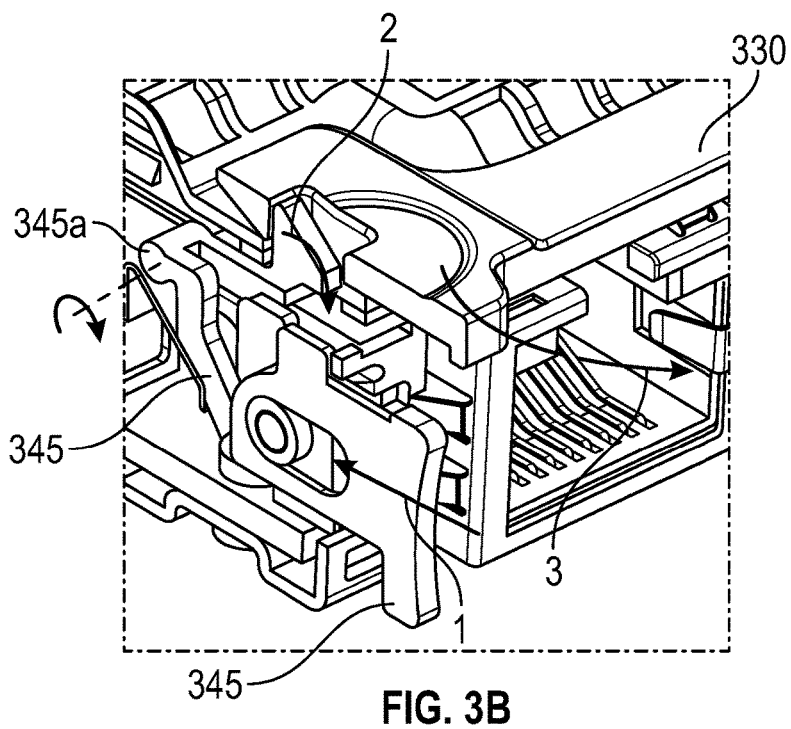
FIG. 3B is an illustration of the operation of an expansion card according to various embodiments.

As illustrated in additional detail with regard to FIG. 3B, an administrator releases the latch 330 from its stored position by depressing a button 345 that is located on the left of expansion card 305. By pressing a button 345, a spring that is connected to a shaft 335 may be unloaded, thus resulting in the rotation of shaft 335 about axis 335a in the direction towards the proximal side of the expansion card 305. Due to this rotation of the shaft 335, a protruding clip of the shaft drops from its position retaining the latch 330 in its stored position. As illustrated in FIG. 3A, latch 335 may be connected to the housing 355 via a spring 335. When latch 330 is pushed into its stored position by an administrator, this spring 335 is loaded. Upon depressing button 345 and releasing latch 330 from its stored position, the unloading of spring 335 serves to partially eject latch 330 from its stored position. The administrator depresses button 345 until latch 330 has been released and partially ejected in this manner. Once latch 330 has been released, the administrator releases button 345 thus resulting in the loading of a spring and returning the shaft to its resting position, although no longer retaining the latch in its stored position.

As illustrated in FIG. 3B, latch 330 has a sloped face on its rear-facing edge. As the latch 330 is pushed back into its stored position by an administrator, this sloped face of the latch 330 is pushed against a corresponding sloped face of the protruding clip of shaft 335. The force applied by the administrator on latch 330 results in the rotation of shaft 335, thus rotating the clip a manner that provides clearance for the latch 330 to be pushed to its stored position. With the latch 330 pushed to this position, the spring connected to shaft 335 unloads such that the clip of the shaft rotates upwards, thus securing the latch in its closed position.

Figure 4A:
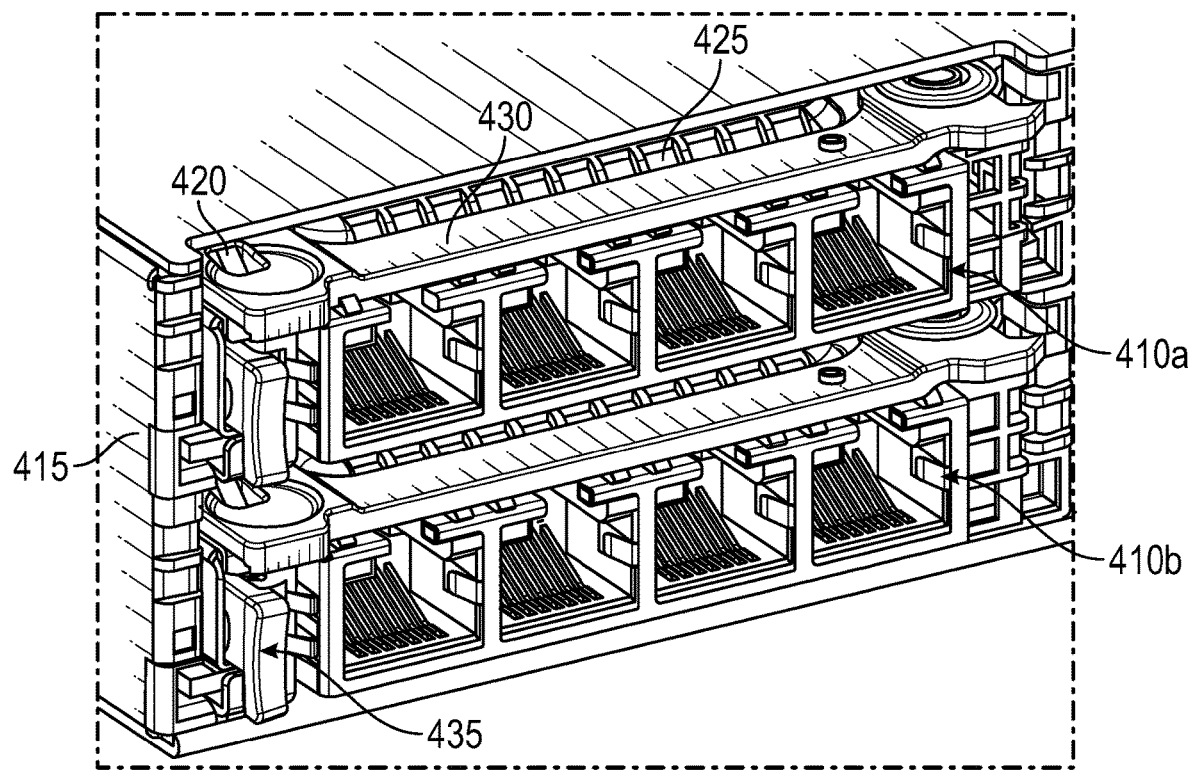
FIG. 4A is an illustration of an expansion card according to various embodiments, where the expansion card is housed within a chassis of an IHS.

FIG. 4A is an illustration of expansion cards according to various embodiments, where the expansion cards are housed within a chassis of an IHS. As described, expansion cards according to embodiments may be plugged into rear-facing expansion bays of an IHS, such as a rack-mounted server. In the illustrated embodiment, two expansion cards 410a-b are stacked vertically within a chassis 415 of an IHS. As described, the dimensions of rack-mounted servers may be constructed to conform to standardized rack dimensions. One such standardized dimension of a rack-mounted chassis includes a vertical height provided in rack units (RUs). In the embodiment illustrated in FIG. 4A, the vertical height of chassis 415 corresponds to one rack unit (RU). As illustrated, the stacked expansion cards 410a-b according to embodiments fit compactly within the vertical dimension of the 1 RU chassis 415. As described in additional detail below, such stacked arrangements of expansion cards 410a-b within a 1 RU chassis 415 supports high density configurations of expansion cards that efficiently utilize the space provided by a 1 RU chassis.

As illustrated in FIG. 4A, each of the expansion cards 410a-b include a push button 435 on the left side of each expansion card. As described above, an administrator can depress button 435 in order to release latch 430 from its closed position that is illustrated in FIG. 4A. Latch 430 is secured in the closed position by the protruding clip 420 of a shaft that rotates to release the latch in response to an administrator pressing button 435. As illustrated, in this closed position, latch 430 is recessed from the proximal face of the expansion cards 410a-b that is formed by the network ports. Also illustrated in FIG. 4A are a row of vents 425 that are attached to the top of housing of the network ports. As described, such vents 425 allow expansion card 410a-b embodiments to ventilate heated air away from inside the expansion bay and thus improve the ability to cool the expansion card. Utilizing such vents 425, expansion card 410a-b embodiments support cooling of the expansion card while also supporting high density arrangements of expansion cards, such as the illustrated stacked configuration of expansion cards 410a-b within the 1 RU chassis 415.

Figure 4B:
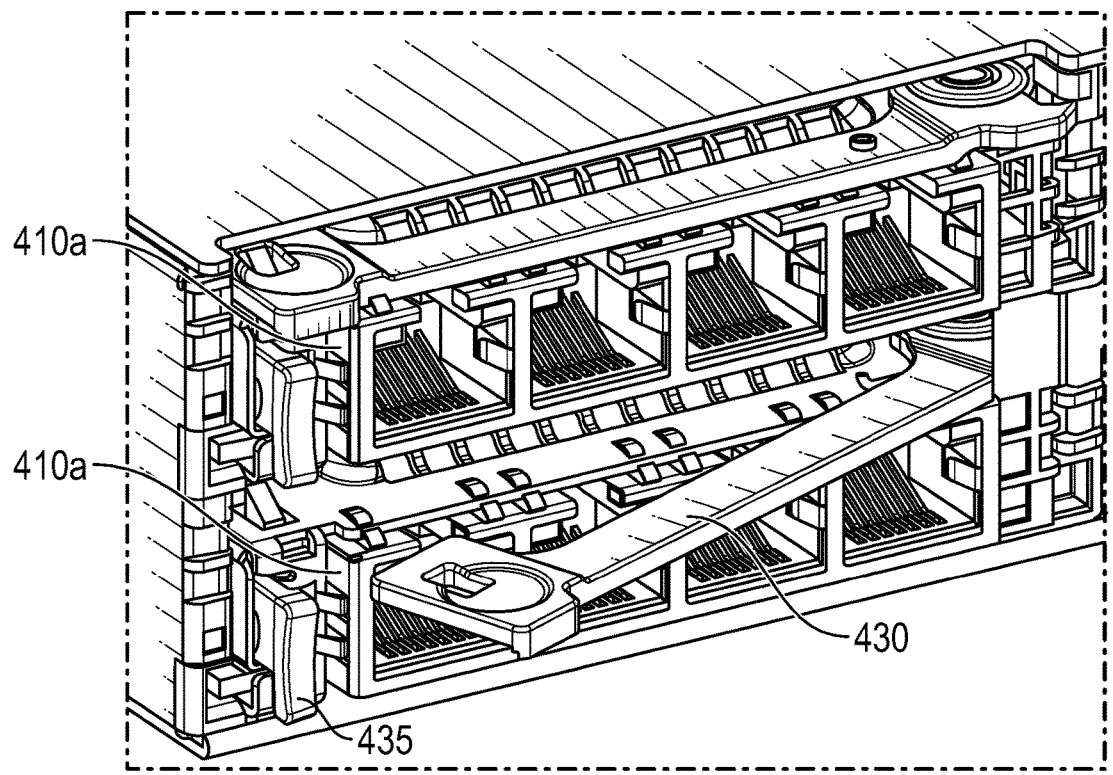
FIG. 4B is an illustration of the operation expansion card of FIG. 4A, where the latch of the expansion card has been ejected.
Figure 4C:
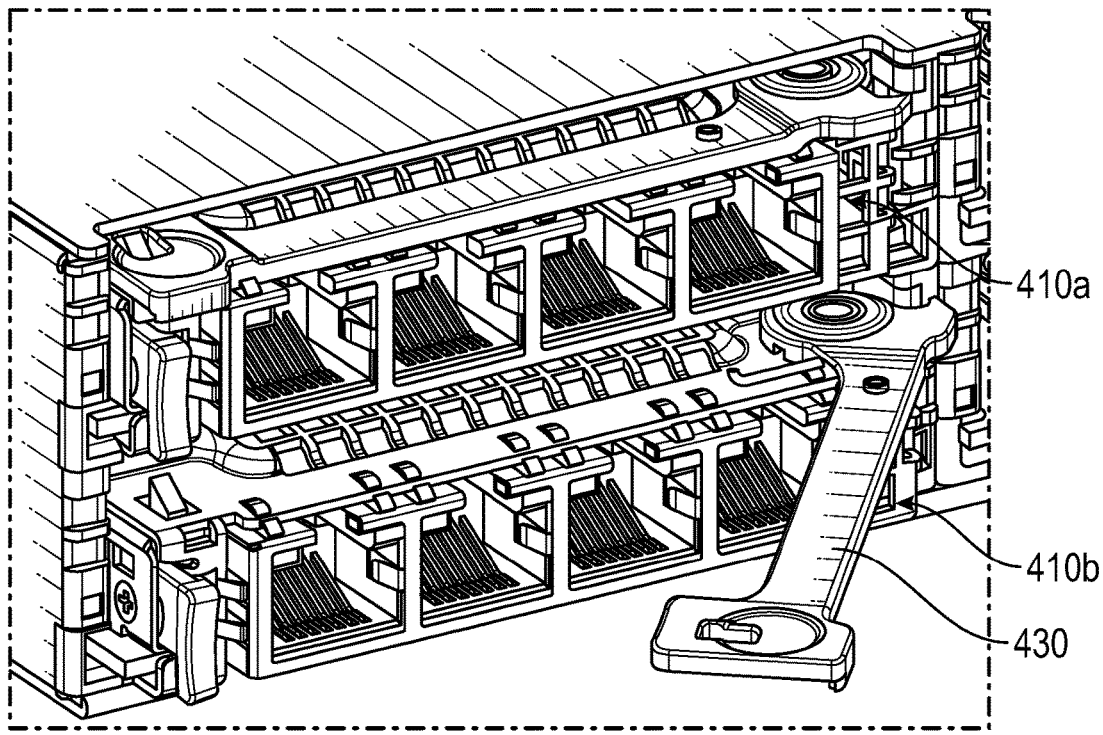
FIG. 4C is an illustration of the further operation of an expansion card of FIGS. 4A-B, where the latch of the expansion card has been pulled outwards.
Figure 4D:
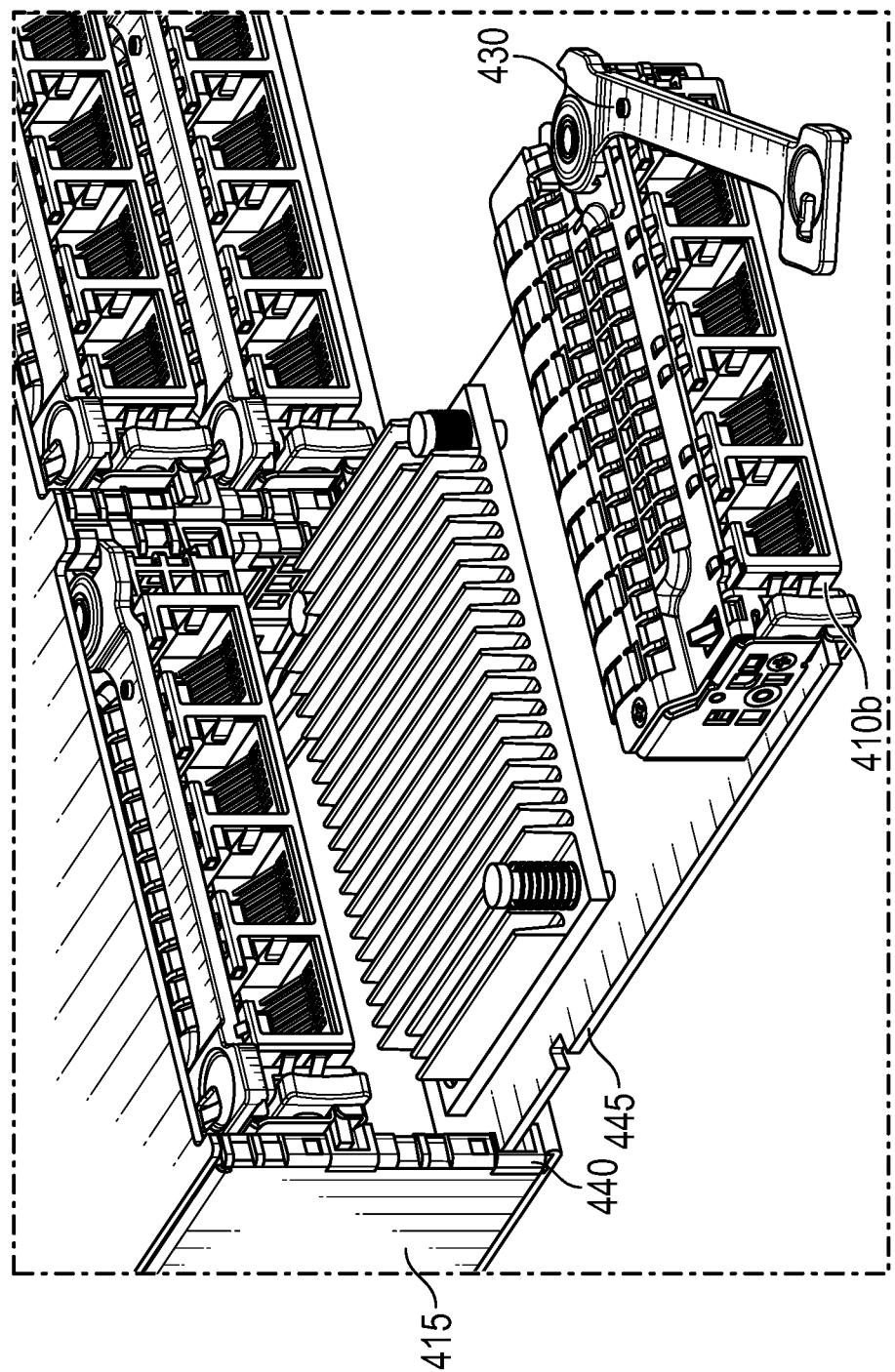
FIG. 4D is an illustration of the further operation of an expansion card of FIGS. 4A-C, where the latch of the expansion card has been used to remove the expansion card from the chassis.

As described, the latch 430 of expansion card 410a-b embodiments may be spring loaded through the administrator pushing the latch 430 into the closed position of FIG. 4A. Button 435 is depressed to begin removal of expansion card 410b from chassis 415. FIG. 4B is an illustration of the ejection of latch 430 resulting from the unloading of the latch spring. Based on the unloading of the latch spring, the latch 430 may be ejected enough to allow an administrator to easily grasp the ejected latch 430. In some embodiments, the unloading of the latch spring may eject latch 430 approximately 20 degrees from its closed position. FIG. 4C is an illustration of latch 430 upon being pulled further outwards by an administrator. In some embodiments, latch 430 may be designed with a limited range of rotation. Upon being stopped from further rotation, the latch 430 in FIG. 4C can then be used by administrator to pull the expansion card 410b from chassis 415, as illustrated in FIG. 4D. In some embodiments, the latch 430 may be prevented from rotating past approximately 50 degrees from its stored position. At this fully rotated angle, an administrator can easily use latch 432 to firmly pull the expansion card 410b from its coupling to the expansion slot of a backplane within chassis 415. As illustrated, the administrator may use the fully-rotated latch 430 to pull the expansion card 410b from chassis 415 by sliding the edges 445 of the expansion card PCB along rails 440 of the chassis 415 until the expansion card 410b has been fully removed.

Figure 5A:
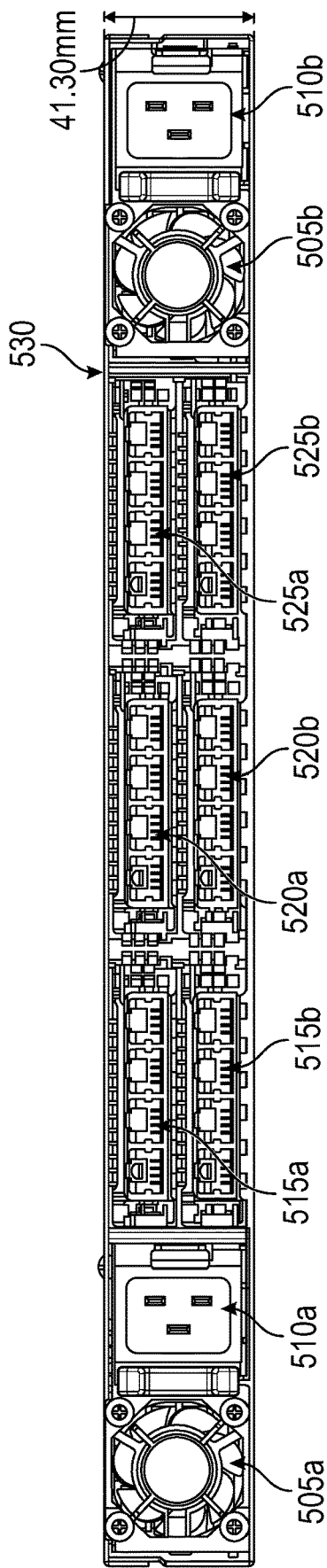
FIG. 5A is an illustration of the rear of a 1 RU (Rack Unit) chassis configured with two layers of expansion cards according to various embodiments.
Figure 5B:
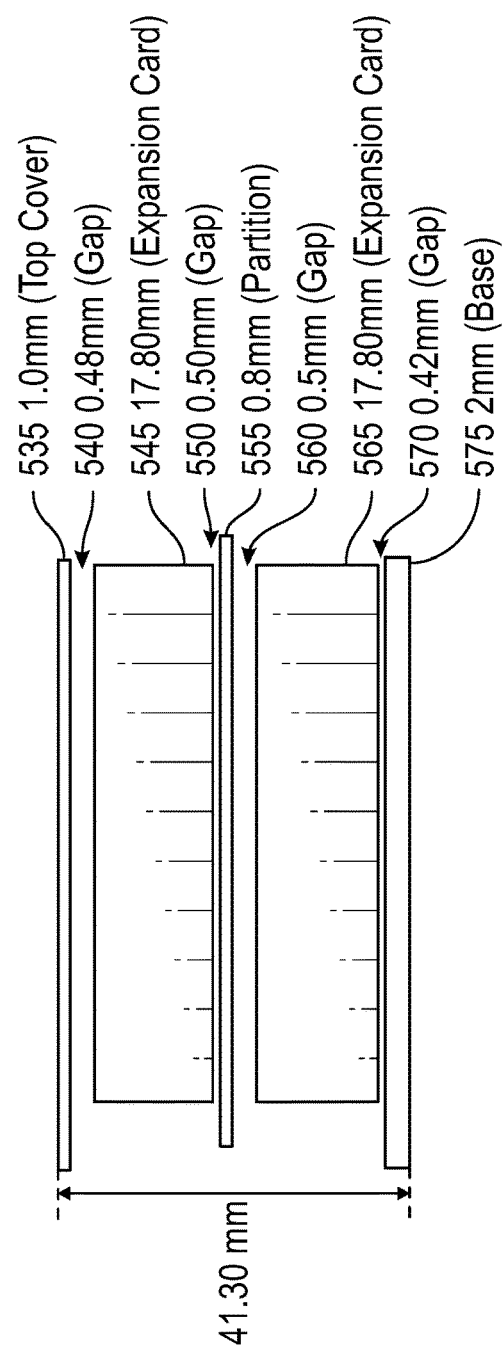
FIG. 5B is a diagram illustrating certain vertical dimensions of the chassis of FIG. 5A that is configured with two layers of expansion cards according to various embodiments.

FIG. 5A is an illustration of the rear of a 1 RU (Rack Unit) chassis configured with two layers of expansion cards according to various embodiments. As in the embodiments of FIGS. 4A-C, expansion cards 515a-b, 520a-b, 525a-b are stacked vertically in pairs within a 1 RU chassis 530. As illustrated, chassis 530 also includes two power supply units 510a-b, each of which has a dedicated exhaust fan 505a-b for venting heated air from within the interior of chassis. FIG. 5B illustrates certain vertical dimensions of the chassis of FIG. 5A that is configured with two layers of expansion cards according to embodiments. As illustrated in FIG. 5B, the thickness, or vertical height, of each of the expansion card 545, 565 embodiments is 17.80 millimeters. Embodiments may vary with regard to the exact thickness of the expansion card, but such variations would be within a half millimeter or possibly a full millimeter of this 17.80 millimeter height illustrated in FIG. 5B.

As illustrated in FIG. 5B, the vertical height of the chassis 530 includes 1 millimeter for the top cover 535 of the chassis, 2 millimeters for the base 575 of the chassis and a 0.8 millimeter partition 555 that physically separates the expansion bays in which each of the expansion cards 545, 565 are installed. As described above, the expansion cards 545, 565 are installed within chassis 530 by sliding the card within rails provided within the expansion bays of chassis 530. In order to accommodate such installations, a gap 550 of 0.50 millimeters is maintained below the top expansion card 545 and a gap 570 of 0.42 millimeters is maintained below the bottom expansion card 575. Gaps are similarly required above each of the expansion cards. Accordingly, a gap 540 of 0.48 millimeters is provided above the top expansion card 545 and a gap 560 of 0.50 millimeters is provided above the bottom expansion card 565. As described, the airflow through these gaps 540, 560 above each of the expansion card 545, 565 embodiments may be increased through the use of vents that are incorporated into the housing that encloses the ports of the expansion cards.

With these vertical dimensions of the chassis 530 and the stacked expansion cards, the vertical height of chassis 530 is approximately 41.30 millimeters. At this thickness, chassis 530 fits closely within a 1 RU slot in a rack that is 44.45 millimeters in height, leaving approximately 3.15 millimeters of tolerance for spacing between the chassis and components installed adjacent to chassis 530 within a rack. Expansion card embodiments of approximately 17.80 millimeters thus support high density configurations of expansion cards that maximize the use of vertical space within a 1 RU chassis. Existing expansion cards, such as those illustrated in FIGS. 1 and 2A-B are typically only 15 millimeters thick, thus limiting the density supported using such existing expansion cards. Due to increased thickness of approximately 17.80 millimeters for expansion card embodiments, the heat sink utilized by expansion card embodiments may be taller than the heat sinks utilized in existing expansion cards. The ability to utilize a taller heat sink increases the surface area of the heat sink fins and thus improves the heat dissipation capacity of the heat sink, further improving the cooling capabilities provided by expansion card embodiments.

Figure 6A:
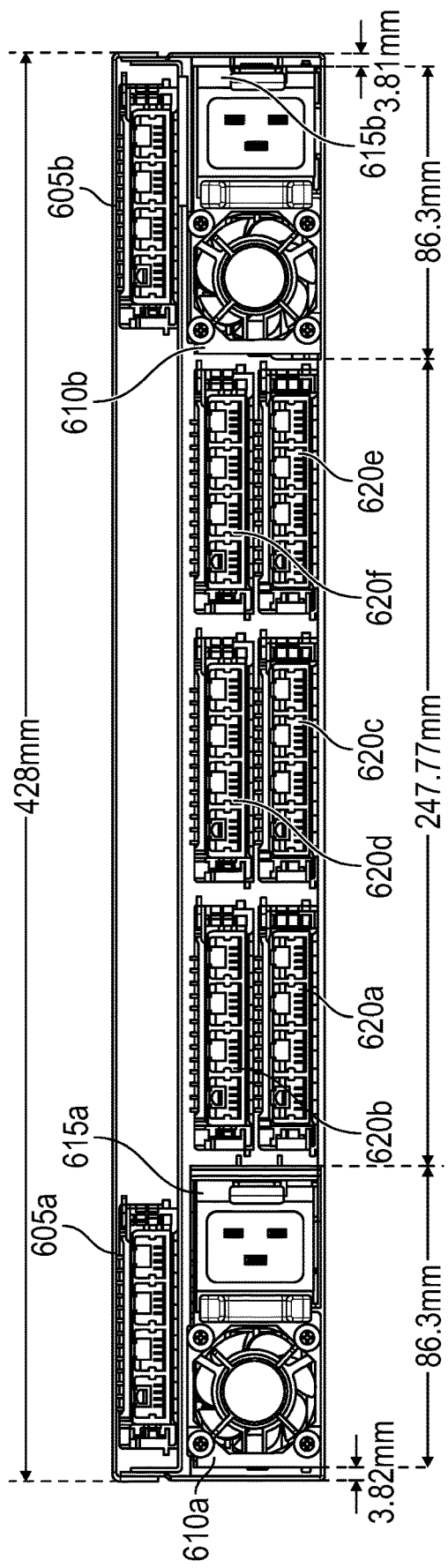
FIG. 6A is an illustration of the rear of a 1.5 RU chassis configured with layers of expansion cards according to various embodiments.

FIG. 6A is an illustration of the rear of a 1.5 RU chassis configured with layers of expansion cards according to various embodiments. In FIG. 6A, the height of chassis 635 corresponds to a 1.5 RU slot in a standard rack. As illustrated, within the vertical dimensions of this chassis 635, three layers of expansion cards according to embodiments may be installed. The top layer of expansion card embodiments includes one expansion card 605a installed directly above a power supply unit 615a and its corresponding exhaust fan 610a and another expansion card 605b installed directly above another power supply unit 615b and its corresponding exhaust fan 610b. This top layer within chassis 635 may also include various other components of the same or similar thickness to the expansion card embodiments 605a-b. As illustrated, the middle layer of components within the chassis 635 includes a row of expansion cards 620b, 620e, 620f according to embodiments that are arranged side-by-side between the power supply units. The bottom layer of components within chassis 635 includes three expansion cards 620a, 620c and 620d that are similarly arranged side-by-side between the power supply units.

Figure 6B:
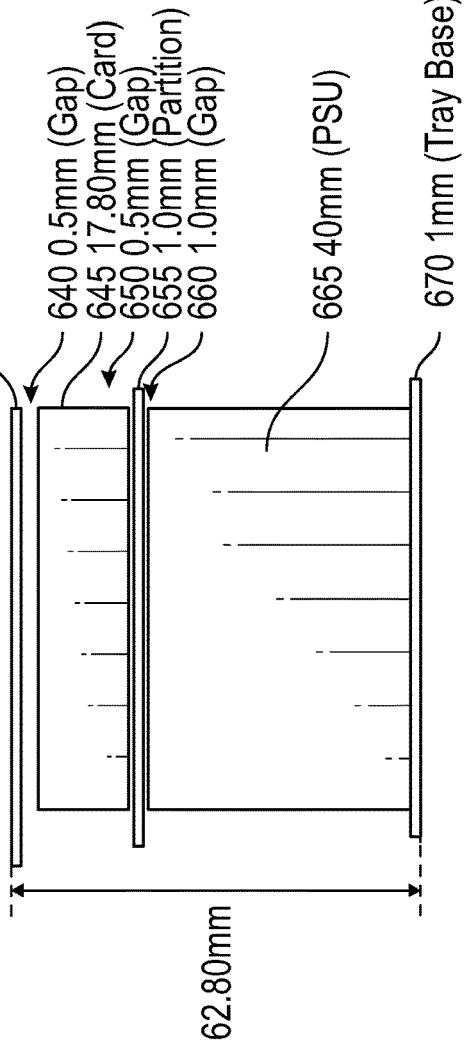
FIG. 6B is a diagram illustrating certain vertical dimensions of the chassis of FIG. 6A that is configured with layers of expansion cards according to various embodiments.

As illustrated in FIG. 6B, this configuration of components within a 1.5 RU chassis supports high density configurations of expansion card embodiments. As with the 1 RU chassis of FIGS. 5A-B, the 1.5 RU chassis 635 is comprised of a 1 millimeter top cover 635, a 1 millimeter base 670 and a 1 millimeter partition 655 separating the top layer and the bottom two layers of the chassis 635. As illustrated in FIG. 6A, the bottom two layers of the 1.5 RU chassis 635 may be occupied by power supply units 615a-b and their respective exhaust fans 610a-b. In many instances, the vertical height of a standard power supply unit corresponds to the height of a 1 RU chassis. This 40-millimeter thickness of a standard power supply unit 665 is reflected in FIG. 6B, along with a 1-millimeter gap 660 above the power supply unit 665. In an expansion bay located directly above the power supply unit 665, an expansion card 645 according to embodiments is installed, where the thickness of the expansion card 645 is 17.80 millimeters and a 0.5 millimeter gap 650 is maintained below the expansion card 645 and another 0.5 millimeter gap 640 is maintained above the expansion card 645. With the vertical space apportioned in this manner, an expansion card 645 according to embodiments may be stacked above a standard power supply unit 665 in a high-density configuration within a 1.5 RU chassis.

As illustrated in FIG. 6A, the horizontal dimensions of expansion card embodiments support efficient use of available horizontal space within a standard rack. In the illustrated embodiment, the width of chassis 635 is 428 millimeters. A gap of 3.8 millimeters is provided at each end of chassis 635 and a standard-width 86.3 millimeter power supply unit is installed adjacent to each of these gaps. As illustrated, such an arrangement leaves a 247.77 millimeter space between the power supply units, providing room for three expansion card embodiments 620a, 620c and 620d installed side-by-side within the space. As described with regard to FIG. 3A, an expansion card according to embodiments is approximately 76 millimeters wide, with the operation of the latch occurring within this width of the expansion card, unlike the existing expansion card handle of FIGS. 2A-B. At a width of 76 millimeters each, the three expansion card embodiments 620a, 620c and 620d occupy 228 millimeters of the available space between the power supply units. This configuration leaves approximately 5 millimeter gaps between each of the expansion cards 620a, 620c and 620d and between the expansion cards 620a, 620d and the adjacent power supply units. Embodiments thus support high density configurations of expansion cards which respect to both the vertical and horizontal dimensions of the chassis 635. As described with regard to the existing expansion cards of FIGS. 1 and 2A-B that require 84.6 millimeters of horizontal space, three existing expansion cards cannot be installed side-by-side within the space illustrated in FIG. 6B.

FIG. 7A is an illustration of the rear of a 2 RU chassis 715 configured with expansion cards according to various embodiments, where the expansion cards are oriented vertically within the chassis. As illustrated, chassis 715 includes two power supply units 710a-b and corresponding exhaust fans 705a-b installed on the bottom layer of the 2 RU chassis. Additional power supply units may be stacked upon the illustrated power supply units 710a-b, thus filling vertical space above the illustrated power supply units 710a-b. Between these power supply units, a series of expansion cards 720a-f according to embodiments are installed vertically within chassis 715. In such embodiments, the expansion cards 720a-f may be coupled to riser cards that extend from backplane or midplane of the IHS housed within chassis 715, where these riser cards support installation of expansion cards oriented vertically, as shown in FIG. 7A. FIG. 7B illustrates vertical dimensions of the chassis of FIG. 7A that is configured with vertically-oriented expansion cards according to various embodiments. The height of chassis 715 is 84 millimeters, thus closely fitting within a 2 RU space of a standard rack. As illustrated in FIG. 7B, chassis 715 may be formed from a 1-millimeter top cover 730 and a 1-millimeter base 740. An expansion card 735 according to embodiments is installed vertically within the 82-millimeter interior height of chassis 715. As described, the width of expansion cards 720a-f according to embodiments is approximately 76 millimeters, thus providing 3-millimeter gaps 745, 750 above and below the expansion cards 720a-f, thus providing space for installing the rails that will receive each of the expansion cards. In this manner, expansion cards 720a-f according to embodiments also support high density configurations when installed vertically within a 2 RU chassis 715. As described, existing expansion cards require upwards of 84 millimeters of horizontal space, thus precluding such vertical installations within a 2 RU chassis 715.

Figure 8:
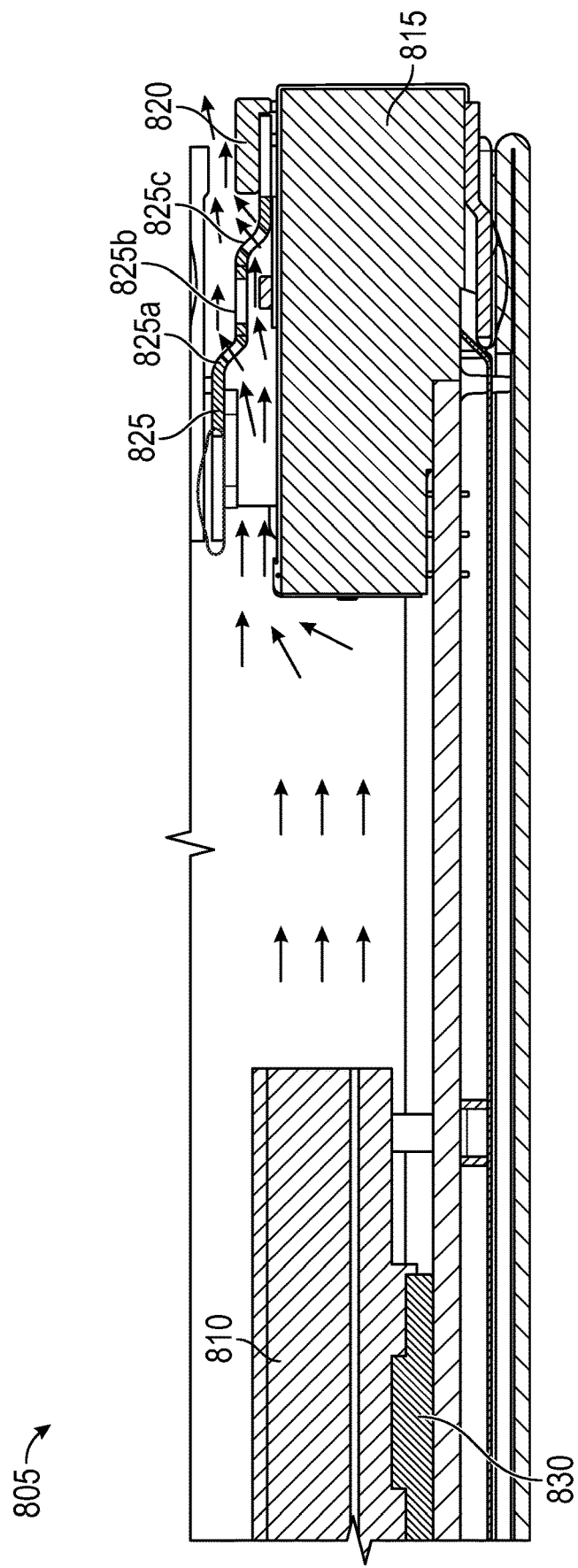
FIG. 8 is an illustration of the ventilation of airflow via the vents of an expansion card according to various embodiments.

FIG. 8 is an illustration of the ventilation of airflow via the vents of an expansion card 805 according to various embodiments. In particular, FIG. 8 illustrates a side view of certain components of an expansion card 805 according to embodiments. As described, expansion card embodiments include a heat sink 810 that dissipates heat generated by components of the expansion card 805, such as by a processor 830 located under the heat sink 810. Also as described, expansion card embodiments include a housing 815 that supports one or more ports for coupling data and/or network connections to the expansion card 805. The side view of FIG. 8 also depicts the described latch 820 that is in its closed position above housing 815 and recessed from the proximal face of the housing 815, and thus remaining unobtrusive to administrators accessing the ports and viewing indicator lights located on the proximal face of the housing 815.

As illustrated, a vent structure 825 is located on top of the housing 815 of the expansion card 805. The vent 825 supports improved cooling by heat sink 810 by providing an airflow pathway by which heated air dissipated by the heat sink 810 can exit the expansion bay in which the expansion card 805 is installed. As illustrated, heated air is ventilated away from heat sink 810 and towards the vent 825 located on top of the housing 815. The embodiment illustrated in FIG. 8 demonstrates a multilevel vent structure 825 that includes three tiers of vents 825a and 825b and 825c. As illustrated by the airflow depicted in FIG. 8, the multilevel vent 825 utilized by certain embodiments promotes the flow of heated air up and over the stored latch 820, thus improving the ability of heat sink 810 to dissipate heat generated in the operation of the expansion card 805. Heated air is ventilated in the illustrated direction towards the rear of the chassis in which the expansion card 805 is installed. A portion of the heated air exits the top sloped tier of vents 825b and is thus directed up and over the stored latch 820. Additional heated air exits via horizontal vents 825b. Another portion of the heated air exits the lower tier of sloped vents 825b and is similarly directed up and over the stored latch 820. Using the illustrated multilevel vent structure 825, embodiments provide improved ability to ventilate heated air away from heat sink 810, while also accounting for the stored latch 820 that partially obstructs this airway. Other embodiments may utilize single-tier and two-tier vent systems that are similarly configured to route heated air up and over the stored latch. Some embodiments may use more than three tiers of vents in supporting ventilation of heated air up and over the stored latch.

Through use of the vent structure 825 installed on top of housing 815 of the expansion card 805, embodiments support cooling of the expansion bay in which expansion card 805 is installed, while allowing for high density configurations of expansion cards, such as described with regard to the above embodiments. As described, high density configurations of expansion cards may utilize minimal spacing between components and the chassis, thus maximizing the use of available space provided by standard rack-mounted chassis. Existing expansion cards utilize significant sized gaps around existing cards in order to support exhaust airflow, thus reducing the density of components that can be supported. Using the described venting structure 825, embodiments support airflow ventilation, while maximizing the component density that may be supported.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An expansion card providing a first capability upon being coupled to an Information Handling System (IHS), the expansion card comprising:
 a printed circuit board of a first width;
 a plurality of pins located on a distal end of the printed circuit board and received by a connector of the IHS;
 a latch that is recessed from a proximal side of the expansion card when the latch is in a stored position, and wherein ejection of the latch from the stored position rotates a first end of the latch away from the expansion card in a horizontal direction; and
 a button operable for ejecting the latch from the stored position when the button is depressed, wherein the first end of the ejected latch that rotates horizontally from the expansion card is operable for an administrator to pull the expansion card from the IHS, and wherein the ejected latch remains within the first width of the printed circuit board as the first end of the latch rotates horizontally from the expansion card.

2. The expansion card of claim 1, wherein the first capability comprises a networking capability and the expansion card further comprises:
 a plurality of I/O ports located on a proximal end of the printed circuit board, wherein the plurality of I/O ports are comprised within a housing.

3. The expansion card of claim 2, further comprising:
 a vent structure attached to a top surface of the housing, wherein the vent structure comprises pathways for the exhaust of heated air from within the IHS.

4. The expansion card of claim 3, wherein the vent structure routes heated airflow past the latch in the stored position.

5. The expansion card of claim 4, wherein the vent structure comprises two or more rows of vents oriented to route the heated airflow past the latch in the stored position.

6. The expansion card of claim 1, wherein the first width is approximately 76 millimeters.

7. The expansion card of claim 5, wherein the vents route the heated airflow through an area between the housing and a top of the latch in the stored position.

8. The expansion card of claim 1, wherein a thickness of the expansion card is approximately 17.8 millimeters.

9. The expansion card of claim 2, wherein the latch is fixed to a top-surface of the housing in the stored position.

10. The expansion card of claim 1, wherein the expansion card is installed vertically within a 2 RU (rack unit) chassis.

11. An Information Handling System (IHS) comprising:
one or more processors and a memory device coupled to the one or more processors;
a chassis;
an expansion bay comprised within the chasses, the expansion bay supporting a coupling to an expansion card providing a first capability to the IHS;
the expansion card comprising:
a printed circuit board of a first width;
a plurality of pins located on a distal end of the printed circuit board and received by the expansion bay coupling;
a latch that is recessed from a proximal side of the expansion card when the latch is in a stored position, and wherein ejection of the latch from the stored position rotates a first end of the latch away from the expansion card in a horizontal direction; and
a button operable for ejecting the latch from the stored position when the button is depressed, wherein the first end of the ejected latch that rotates horizontally from the expansion card is operable for removing the expansion card from the expansion bay of the IHS, and wherein the ejected latch remains within the first width of the printed circuit board as the first end of the latch rotates horizontally from the expansion card.

12. The IHS of claim 11, wherein the first capability comprises a networking capability and the expansion card further comprises:
a plurality of I/O ports located on a proximal end of the printed circuit board, wherein the plurality of I/O ports are comprised within a housing.

13. The IHS of claim 11, further comprising:
a vent structure attached to a top surface of the housing, wherein the vent structure comprises pathways for the exhaust of heated air from within the expansion bay.

14. The IHS of claim 11, wherein the first width is approximately 76 millimeters.

15. The IHS of claim 11, wherein a thickness of the expansion card is approximately 17.8 millimeters.

16. The IHS of claim 13, wherein the vent structure routes heated airflow between a housing of the expansion card and the latch in the stored position.

17. A method for decoupling an expansion card from an Information Handling System (IHS), wherein the expansion card comprises a plurality of I/O ports, the method comprising:
depressing a button located on a proximal face of the expansion card, wherein depressing the button partially ejects a latch of the expansion card from a stored position above the I/O ports, wherein latch is recessed from a proximal side of the expansion card when the latch is in the stored position, and wherein ejection of the latch from the stored position rotates a first end of the latch away from the expansion card in a horizontal direction;
rotating the partially ejected latch horizontally away from the expansion chard to a fully ejected position, wherein the fully ejected latch remains within a first width of the expansion card; and
pulling on the fully ejected latch in order to remove the expansion card from an expansion slot of the IHS.

18. The method of claim 17, wherein the expansion card comprises a vent structure that comprises pathways for the exhaust of heated air over a top of the latch in the stored position.

19. The method of claim 17, wherein the first width is approximately 76 millimeters.

20. The method of claim 17, wherein a thickness of the expansion card is approximately 17.8 millimeters.

* * * * *